Nov. 20, 1962      P. B. SHUTT      3,064,432
MASTER CYLINDER CONSTRUCTION
Filed Aug. 15, 1960
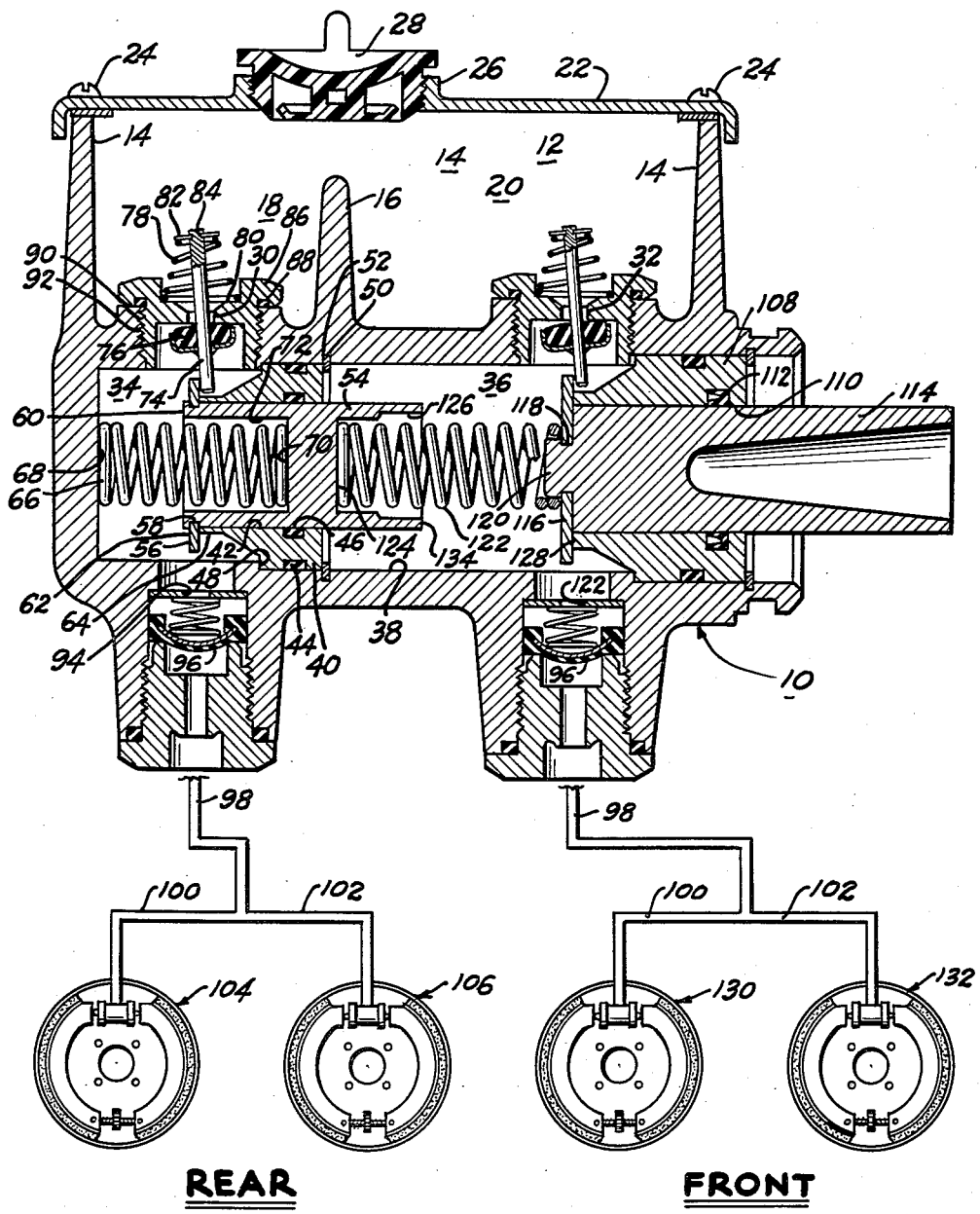
REAR          FRONT
*INVENTOR.*
PAUL B. SHUTT.
BY
*John A. Young*
ATTORNEY.

United States Patent Office 3,064,432
Patented Nov. 20, 1962

3,064,432
MASTER CYLINDER CONSTRUCTION
Paul B. Shutt, St. Joseph, Mich., assignor to The Bendix Corporation, South Bend, Ind., a corporation of Delaware
Filed Aug. 15, 1960, Ser. No. 49,476
1 Claim. (Cl. 60—54.6)

This invention relates to a master cylinder construction, and more specifically, to a master cylinder construction having distinct fluid connections with the front wheel brakes and rear wheel brakes respectively so that in the event of hydraulic failure of the system associated with one of the sets of brakes the other, being hydraulically independent, will remain operative.

This arrangement of separating the hydraulic system into two fluid sub-systems for actuating the front wheel brakes and rear wheel brakes, respectively, increases the safety and reliability of the actuating system as a whole since total inoperativeness will not result should there be a failure at any portion of the hydraulic system. In the master cylinder constructions currently in use, there is a common fluid system for applying each of the four wheel brakes and by virtue of the mutual interconnections, should failure occur at any section of the hydraulic system then all of the brakes become inoperative. The potentially hazardous arrangement described is rectified in the present invention providing two distinct hydraulic actuating means which are sealed against communication one with the other and in which means each is separately replenished from separated fluid reservoir sections.

Although separation of the hydraulic actuating system into two distinct portions is not of itself new (it is referred to sometimes by those skilled in the art as a "split-system"), previous proposals along these lines have not been popularized because of their added cost and additional brake pedal travel requirement and also because of the structural complexity which add to the cost of fabrication and assembly of the parts.

It is one of the objects of the present invention to provide a master cylinder construction having distinct fluid systems for the front wheel brakes and rear wheel brakes, and which are so separated that failure of one will not render the other inoperative, and to obtain such results by means of a master cylinder construction having greater simplicity and hence less cost. By means of achieving this stated object, it is more convenient to manufacture the master cylinder, to assemble it and to maintain it.

A further object of the invention is to provide a dual fluid system connecting independently with the front wheel and rear wheel brakes and having parts which are common to both systems, so that it is possible to effect greater economy and also facilitate servicing of the system.

It is a further object of the invention to provide, in the dual fluid actuating systems, a slightly higher pressure which is communicated to the front wheel brakes than is communicated to the rear wheel brakes because the front wheel brakes do a greater amount of work because of the higher axle loading on the front axle than on the rear axle.

Other objects and features of the present invention will become apparent from a consideration of the following description which proceeds with reference to the accompanying drawing which is a section view taken through the center of the master cylinder and showing fluid connections to the front wheel brakes and rear wheel brakes. The components of the master cylinder are shown as they appear during brake release in which the plungers are retracted, this being the normal condition of the master cylinder.

The master cylinder, designated generally by reference numeral 10, includes a reservoir 12 defined by exterior walls 14 and a partition 16 which divides the reservoir 12 into two separate compartments 18 and 20. Cover plate 22 is fastened by screws 24 to the walls 14 to enclose the chamber 12. The cover plate 22 has an interiorly threaded boss 26 which receives the usual filler cap 28, the function of the filler cap being to prevent loss from splashing of the fluid within reservoir 12, while at the same time permitting inflow of air to prevent subatmospheric pressure within the reservoir 12 as fluid is withdrawn from either compartment 18, 20. Each compartment 18, 20 has a compensating port 30, 32 through which fluid is passed into chambers 34 and 36 of cylinder bore 38. The two chambers 34 and 36 are separated by an immovable wall 40 having a central opening 42 and seals 44 and 46 at its outer and inner circumference. The wall 40 bears against shoulder 48 which is formed as a step in the cylinder bore 38 and is held at its opposite ends by a snap ring 50 received within a groove 52 of the cylinder bore 38.

A first plunger 54 is mounted for slidable movement within opening 42 and includes a snap ring 56 fitted within a groove 58 at the end 60 of the plunger 54, the purpose of the snap ring 56 being to engage end 62 of sleeve 64 formed integrally with the wall 40. A retracting spring 66 bears at one end against the end wall 68 and at the other end against the base 70 of a recess 72 within the plunger 54. The plunger 54 is biased to a retracted position defined by engagement of the snap ring 56 with the end 62 of the sleeve 64. In the retracted position of the plunger, the snap ring 56 also engages stem 74 of a tilt valve controlling opening and closing of the port 30 to establish or break communication between compartment 18 and chamber 34. The seal 76 is twisted away from the port 30 against the resistance of frusto-conical spring 78 which is retained between seat 80 and washer 82 received within slot 84 at the end of the stem 74. The compensating valve is mounted by means of a threaded plug 86 having a seal 88 and a threaded sleeve 90 received within a companion threaded opening 92 of the master cylinder. The chamber 34 has an outlet 94 controlled by a residual pressure check valve designated generally by reference numeral 96 and a brake line 98 with branches 100 and 102 leading to the front wheel brakes designated generally by reference numerals 104 and 106, respectively. The check valve 96 is not part of the present invention and complete details of its construction and function are disclosed in Re. 24,664 issued June 30, 1959, titled "Residual Pressure Check Valve." A second wall 108 is fitted within the cylinder bore 38 to close the open end of the cylinder bore 38 and includes an opening 110 with a seal 112 in slidable contact with a second plunger 114 which is mounted for slidable movement through opening 110. The second plunger 114 has a snap ring 116 which fits within slot 118 at end 120 of the plunger 114 and a second return spring 122 bearing against the bottom 124 of a recess 126 in the plunger 54 and bearing at the opposite end against snap ring 116 to bias plunger 114 retractively until snap ring 116 engages end 128 of closure 108. The snap ring 116 engages the stem of a tilt valve which is identical in construction to that previously described, and functions identically to the one previously described. The chamber 36 has an outlet opening 122 which is controlled by a check valve 96 of the same construction and function previously described. In similar manner, the outlet line 98 includes branch lines 100 and 102 leading to the front wheel brakes designated generally by reference numerals 130 and 132, respectively.

In operation, when the operator develops applying force the plunger 114 is urged toward the left, developing applying force within chamber 36, this applying force also being effective to urge plunger 54 leftwardly. During initial movements of the plungers 114 and 54 leftwardly, the tilt valves move uprightly closing compensating ports 30 and 32 to permit buildup of pressure within chambers 34 and 36. The return spring 66 has a slightly greater rate than that of spring 122, typical values of these spring rates being ten pounds per inch and five pounds per inch, respectively, so that the pressure within chamber 36 is slightly higher and hence the applying force communicated to the front wheel brakes 130, 132 is slightly greater than the applying force communicated to the rear wheel brakes 104, 106. This is desirable since the front wheel brakes normally do a greater amount of work in shtopping the vehicle because of the greater axle loading on the front axle. Since plungers 114 and 54 have the same outer diameter, the same fluid displacement is provided for the front wheel brakes and the rear wheel brakes and they are all applied simultaneously but in different degrees.

Should there be a failure in any portion of the hydraulic line associated with the rear wheel brakes, then no pressure develops in chamber 34 as the plunger 114 is urged leftwardly and, therefore, the plunger 114 will bias the plunger 54 leftwardly against the resistance of spring 66 until the end 60 bottoms out against the end wall 68 of the cylinder bore 38 and thereafter additional movement of the plunger 114 will develop hydraulic pressure within chamber 36 sufficient to apply the front wheel brakes 130, 132 fully. Any failure of any type in the hydraulic portion of the hydraulic system associated with the rear wheel brakes 104, 106 will not drain the hydraulic fluid required for the front wheel brakes since partition 16 in reservoir 12 segregates fluid necessary for the front wheel brakes within compartment 20. As a result, the vehicle is not without brakes even should the hydraulic system to the rear wheel brake be rendered completely unusable.

Assuming that the hydraulic system for the front wheel brakes has been damaged and is inoperative, initial movement of the plunger 114 leftwardly will compress the spring 122 and spring 66 until snap ring 116 bottoms against end 134 of plunger 54 and a direct mechanical abutment connection is thereby obtained between plunger 114 and plunger 54 so that additional movement of plunger 114 biases plunger 54 leftwardly to develop fluid pressure within chamber 34, which pressure is communicated to the rear wheel brakes 104 and 106. Buildup of pressure in chamber 34 is entirely independent of any hydraulic failure which might have occurred in the hydraulic system associated with the front wheel brakes 130, 132. Even though all of the brake fluid has drained from compartment 20 and other portions of the system related to brakes 130, 132 the fluid which is segregated within compartment 18 is sufficient for the requirements of rear wheel brakes 104, 106, and the operating system for brakes 104, 106 is not disturbed.

Thus, all four brakes are operated simultaneously as long as the fluid system remains undamaged but should any failure occur to render either the front wheel or the rear wheel brakes inoperative, then no effect is had on the undamaged portion of the system so at least one pair of brakes is at all times available. Of course, the operator has a general awareness of some malfunctions since only one set of brakes provides an inferior, although effective, stopping action on the vehicle and he then proceeds to make the necessary repairs.

Although only one embodiment of the invention has been selected for purposes of illustration, it will be understood that this is in no way restrictive of the invention. It is reasonable to assume that those skilled in the art can make numerous adaptations and revisions of the invention as suit design requirements and it is intended that such revisions and adaptations of the invention which incorporate the herein disclosed principles will be included within the scope of the following claims as equivalents of the invention.

What is claimed is:

A master cylinder construction comprising an integral one-piece fluid reservoir and a cylindrical bore having a closed front end and an open rear end; the upper wall of said cylindrical bore being the bottom surface of said reservoir; said fluid reservoir having a partition therein separating the fluid reservoir into two distinct sections isolated one from the other; the upper wall of said cylindrical bore having two spaced ports communicating respectively with said sections; valve means in said ports; first and second removable annular walls in said bore, the arrangement along a longitudinal axis of said bore from front to rear being port, first wall, port, and second wall, with the first wall dividing said cylinder bore into two chambers, one connecting to front wheel brakes and the other to rear wheel brakes; said bore having two annular abutment surfaces one for each removable wall; each said abutment surface being located in front of their respective walls for movement of said removable walls frontwardly; said cylinder bore further having two annular grooves, one for each removable wall; each of said annular grooves being located at the rear of their respective walls; the distance between each of said annular abutment surface and each said groove being substantially the same as the width of their respective removable wall; each said groove being located a predetermined distance from its respective port; a snap ring fitting in each of said grooves and preventing movement of said wall rearwardly; each of said walls having a skirt integral therewith and projecting frontwardly, the ends of which define stop means; each of said removable walls and skirts having a central bore therein; a first and second pressure developing member slidable within the central bores of said first and second removable walls and skirts, respectively; means on the front end of said slidable members engaging said stop means to define the retracted position of said slidable members; said last named means further having means for opening said valve means and communicating said sections with their respective chambers when said slidable members are in retracted position; first spring means located between said first pressure producing member and said closed end and second spring means located between said first pressure producing member and said second pressure producing member; said first spring means being of greater spring rate than said second spring means; and sealing means for rendering said chambers fluid tight.

References Cited in the file of this patent

UNITED STATES PATENTS

| 2,525,740 | Trevaskis | Oct. 10, 1950 |
| 2,649,692 | Stelzer | Aug. 25, 1953 |

FOREIGN PATENTS

| 1,045,724 | France | July 1, 1953 |

OTHER REFERENCES

Germany, application (K1 63c 54/02), 1,037,287, printed Aug. 21, 1958.